United States Patent
Mai et al.

(10) Patent No.: US 8,605,056 B2
(45) Date of Patent: Dec. 10, 2013

(54) TOUCH-CONTROLLED DEVICE, IDENTIFYING METHOD AND COMPUTER PROGRAM PRODUCT THEREOF

(75) Inventors: Wei-Kuo Mai, Hsinchu (TW); Tung-Ming Yang, Hsinchu (TW)

(73) Assignee: Elan Microelectronics Corporation, Hsinchu (TW)

( * ) Notice: Subject to any disclaimer, the term of this patent is extended or adjusted under 35 U.S.C. 154(b) by 74 days.

(21) Appl. No.: 13/437,405

(22) Filed: Apr. 2, 2012

(65) Prior Publication Data
US 2012/0262415 A1    Oct. 18, 2012

(30) Foreign Application Priority Data
Apr. 15, 2011  (TW) .............................. 100113326 A (51) Int. Cl.
*G06F 3/045*    (2006.01)

(52) U.S. Cl.
USPC .......................................... 345/174; 345/173

(58) Field of Classification Search
USPC ................... 345/173–178; 178/18.01–18.07, 178/19.01–19.05
See application file for complete search history.

(56) References Cited

U.S. PATENT DOCUMENTS

| | | | |
|---|---|---|---|
| 2006/0197750 A1* | 9/2006 | Kerr et al. | 345/173 |
| 2006/0244735 A1* | 11/2006 | Wilson | 345/173 |
| 2008/0259053 A1* | 10/2008 | Newton | 345/175 |
| 2009/0227295 A1* | 9/2009 | Kim | 455/566 |
| 2009/0227296 A1* | 9/2009 | Kim | 455/566 |
| 2010/0166404 A1* | 7/2010 | Lombardi | 396/89 |
| 2011/0050619 A1* | 3/2011 | Griffin | 345/174 |
| 2011/0163967 A1* | 7/2011 | Chaudhri | 345/173 |

* cited by examiner

*Primary Examiner* — Ricardo L Osorio
(74) *Attorney, Agent, or Firm* — Patterson, Thuente, Pedersen PA (57) ABSTRACT

A touch-controlled device, an identifying method and a computer program product thereof are provided. The touch-controlled device comprises a touch panel and a processor. The processor is electrically connected to the touch panel, and is configured to detect a first touched region and a second touched region of the touch panel. The processor is further configured to identify one of the first touched region and the second touched region as being touched by a major input object and the other one as being touched by a non-major input object according to a ratio of a moving velocity to a touch area of each of the first and second touched regions.

24 Claims, 7 Drawing Sheets

TOUCH-CONTROLLED DEVICE, IDENTIFYING METHOD AND COMPUTER PROGRAM PRODUCT THEREOF

This application claims priority based on Taiwan Patent Application No. 100113326 filed on Apr. 15, 2011, which is hereby incorporated by reference in its entirety.

CROSS-REFERENCES TO RELATED APPLICATIONS

Not applicable.

BACKGROUND OF THE INVENTION

1. Field of the Invention

The present invention relates to a touch-controlled device, an identifying method and a computer program product thereof. More particularly, the touch-controlled device of the present invention can detect a plurality of touched regions and identify one of the touched regions as being touched by a major input object and the others as being touched by at least one non-major input object.

2. Descriptions of the Related Art

Due to the advancement of the science and technologies of displays, various electronic products have been equipped with a display (e.g., personal digital assistants (PDAs), flat panel computers, digital video cameras, information appliances and 3G mobile phones) and are now widely used in people's daily life. Additionally, to cater for the users' demands for information input in an intuitive way, some electronic products are equipped with a touch panel on the display to facilitate direct input through touch by users. In terms of sensing principles thereof, touch panels may be categorized into resistive touch panels, capacitive touch panels, infra-red (IR) touch panels and ultrasonic touch panels, among which the capacitive touch panels are widely adopted in such electronic products.

Figure 1:
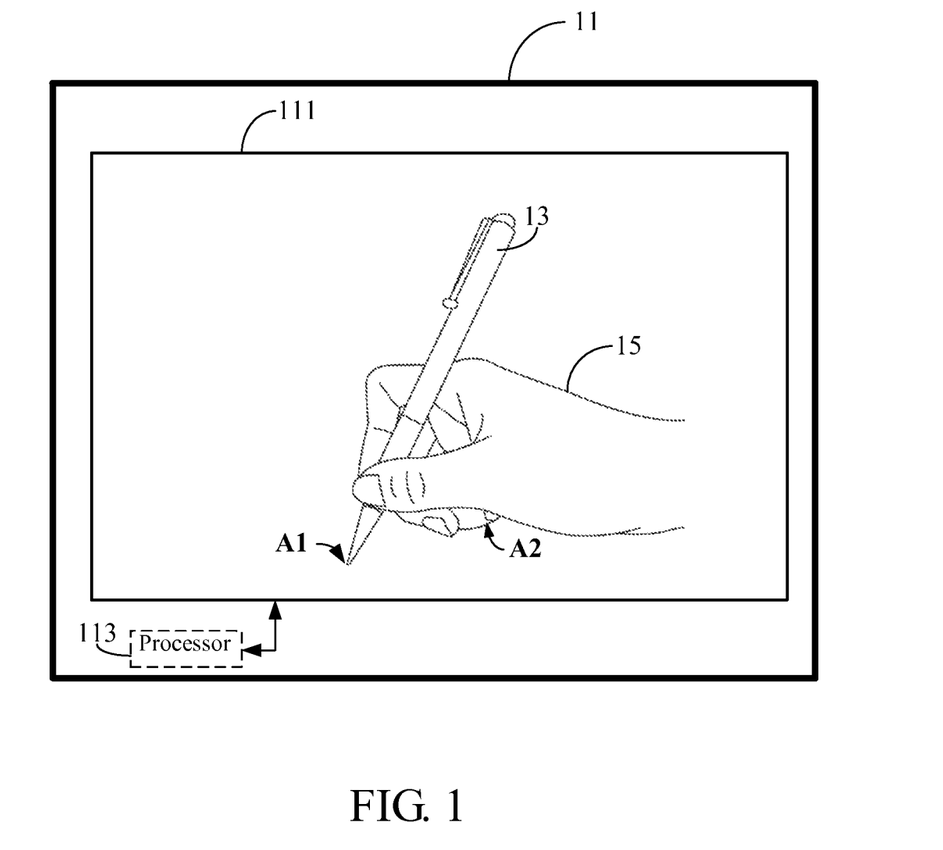
FIG. 1 is a schematic view illustrating the operations on a conventional flat panel computer.

Currently, the touch input is mostly accomplished by using the user's finger or a touch stylus as an input medium to directly touch the touch panel so that a sensing signal is generated by the touch panel. However, as shown in FIG. 1, when the user uses a touch stylus 13 as an input medium on, for example, a flat panel computer 11, the user's hand 15 tends to make contact with the touch panel 111 simultaneously with the touch stylus 13 because of the writing habits of common users. In such a case, two or more touched regions (e.g., a region A and a region B shown in FIG. 1) will be detected by the processor 113 of the flat panel computer 11, which makes it impossible for the processor 113 to identify which one of the touched regions is touched by the touch stylus 13 and which one is touched by the hand 15. As a result, the user cannot operate the touch panel 111 in the usual writing habits, thus leading to inconveniences in use.

Accordingly, an urgent need still exists in the art to identify the touched region by a touch stylus from a plurality of touched regions.

SUMMARY OF THE INVENTION

An objective of the present invention is to provide a touch-controlled device, which can identify from a plurality of touched regions the one that is touched by a touch stylus. Then, the user can operate the touch-controlled device in the usual writing habits. More specifically, the touch-controlled device of the present invention comprises a touch panel and a processor. The processor calculates a ratio of a moving velocity to a touch area of each of the touched regions, and then identifies one of the touched regions as being touched by a major input object and the others as being touched by at least one non-major input object.

Another objective of the present invention is to provide an identifying method for the processor of the aforesaid touch-controlled device. Thus, the processor can identify from a plurality of touched regions a touched region that is touched by a touch stylus. Thereby, the user can operate the touch-controlled device in the usual writing habits.

To achieve the aforesaid objectives, the present invention discloses a touch-controlled device, which comprises a touch panel and a processor. The processor, which is electrically connected to the touch panel, is configured to detect a first touched region and a second touched region of the touch panel and to define a first touch area of the first touched region and a second touch area of the second touched region. The processor is further configured to calculate a first moving velocity of the first touched region and a second moving velocity of the second touched region, and identify one of the first touched region and the second touched region as being touched by a major input object and the other of the first touched region and the second touched region as being touched by a non-major input object according to a ratio of the first moving velocity to the first touch area and a ratio of the second moving velocity to the second touch area.

The present invention further discloses an identifying method for a processor of the aforesaid touch-controlled device. The identifying method comprises the following steps of: detecting a first touched region and a second touched region of a touch panel and defining a first touch area of the first touched region and a second touch area of the second touched region; calculating a first moving velocity of the first touched region and a second moving velocity of the second touched region; and identifying one of the first touched region and the second touched region as being touched by a major input object and the other of the first touched region and the second touched region as being touched by a non-major input object according to a ratio of the first moving velocity to the first touch area and a ratio of the second moving velocity to the second touch area.

Additionally, to achieve the aforesaid objectives, the present invention further provides a computer program product with a program for executing the aforesaid identifying method stored therein. When the program is loaded into a touch-controlled device with a touch panel and a processor, the program can be executed by the processor to accomplish the aforesaid identifying method.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

The following embodiments are only for the purpose of illustration rather than to limit the present invention. It shall be appreciated that in the following embodiments and the attached drawings, elements unrelated to the present invention are omitted from depiction; and the dimensional relationships among individual elements in the attached drawings are illustrated only for the ease of understanding but not to limit the actual scale.

Figure 2A:
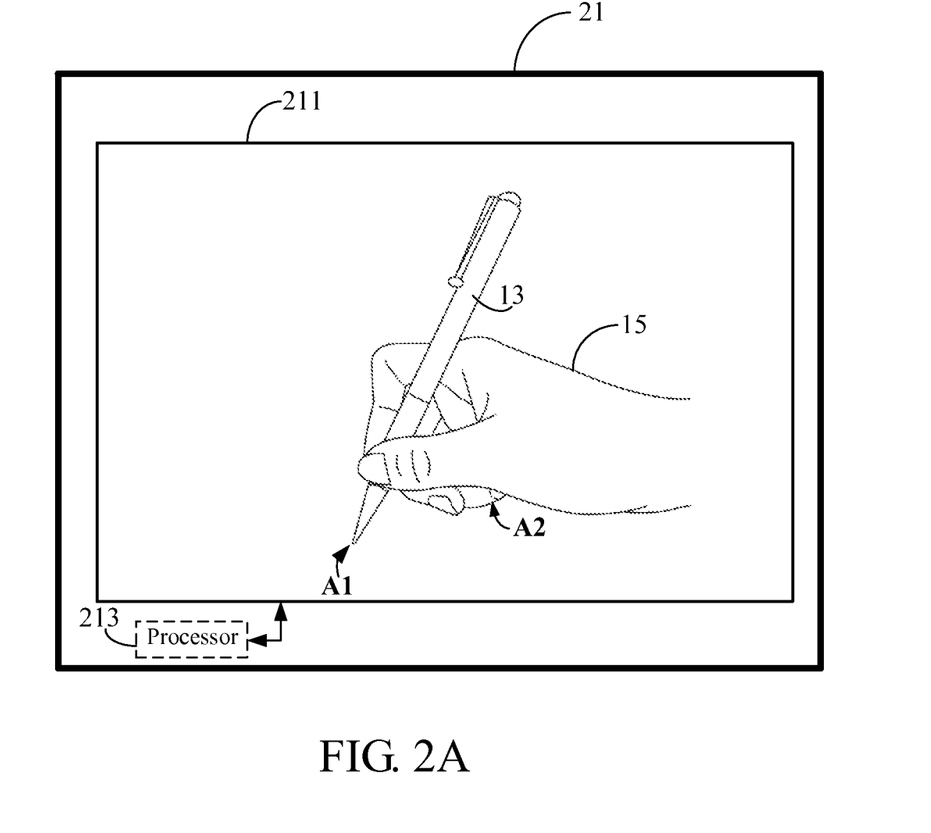
FIG. 2A to FIG. 2D are schematic views illustrating the operations on a touch-controlled device of the present invention, which corresponds to the first embodiment of the present invention.
Figure 2B:
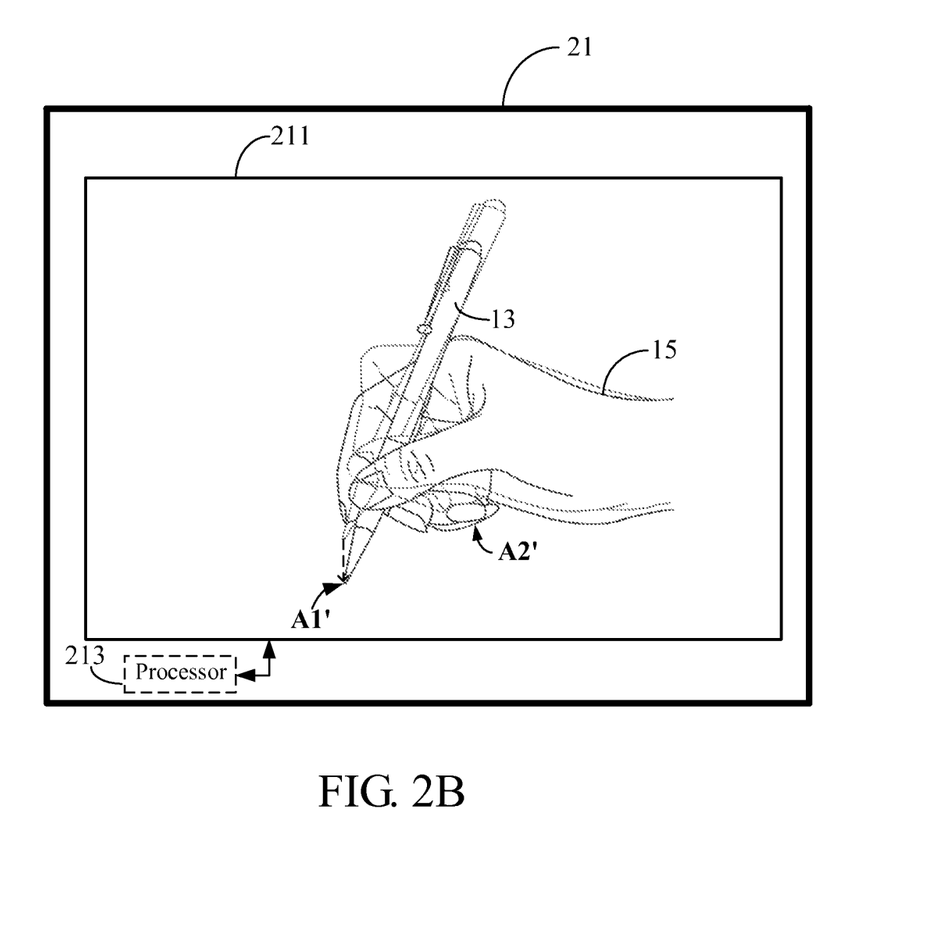

The first embodiment of the present invention is shown in FIGS. 2A and 2B, which are schematic views illustrating the operations on a touch-controlled device 21 of the present invention. The touch-controlled device 21 comprises a touch panel 211 and a processor 213. It shall be noted that for simplicity of description, other elements of the touch-controlled device 21 such as a display module, a communication module, a power supply module and elements less related to the present invention are all omitted from depiction.

When the user operates the touch panel 211 by using a touch stylus 13 in the usual writing habits, an electrical parameter value of the touch panel will be changed because the touch panel 211 is touched by the touch stylus 13 and a hand 15. Specifically, the touch panel 211 has a plurality of sensing units which are uniformly distributed over the entire touch panel. Each of the sensing units can be represented by a coordinate value, so when the touch panel 211 is touched by the touch stylus 13 and the hand 15, some of the sensing units exhibit a variation of the electrical parameter value. Accordingly, when the variation of the electrical parameter value of the some of the sensing units is greater than a preset value, a first touched region and a second touched region of the touch panel will be sensed by the processor 213 according to the coordinate values of the some of the sensing units.

For example, when the touch stylus 13 touches a region A1 of the touch panel 211 and the hand 15 touches a region A2 of the touch panel 211, the sensing units in the region A1 and the region A2 will exhibit a variation of the electrical parameter value. Therefore, the processor 213 can identify the region A1 as the first touched region and the region A2 as the second touched region according to the coordinate values of the sensing units and distances between the sensing units. It shall be appreciated that in this stage, the processor 213 only knows that the electrical parameter value of the sensing units in the region A1 and the region A2 has been changed, but does not know which one of the regions comprises sensing units touched by the touch stylus 13 and which one comprises sensing units touched by the hand 15. The first touched region and the second touched region may be differentiated in many ways, and may be differentiated by using an approach for identifying an object in the field of optics, which will not be further described herein.

Then, the processor 213 further defines a first touch area of the first touched region and a second touch area of the second touched region according to the coordinate values of the sensing units. In detail, the processor 213 calculates an area of the region A1 as the first touch area based on the geometrical principle and according to the coordinate values of the sensing units in the region A1, and calculates an area of the region A2 as the second touch area based on the geometrical principle and according to the coordinate values of the sensing units in the region A2.

Then, the user moves the touch stylus 13 and the hand 15; i.e., as shown in FIG. 2B, the regions in which the sensing units exhibit the variation of the electrical parameter value are changed from the region A1 to a region A1' and from the region A2 to a region A2'. At this point, in response to the variation of the electrical parameter value exhibited by the sensing units in the region A1' and the region A2', the processor 213 can detect that the first touched region is changed from the region A1 to the region A1' and the second touched region is changed from the region A2 to the region A2'.

It shall be particularly noted that those of ordinary skill in the art may readily appreciate that because the sensing units in the touched regions will exhibit the variation of the electrical parameter value when the touch panel 211 is touched by the touch stylus 13 and the hand 15, the processor 213 can detect which regions of the touch panel 211 are touched. Additionally, the processor 213 periodically detects the electrical parameter value of each of the sensing units of the touch panel 211, and re-defines the first touch area of the first touched region and the second touch area of the second touched region according to the coordinate values of the sensing units. In other words, the first touch area and the second touch area may change with movement of the touch stylus 13 and the hand 15 by the user, so the areas of the region A1 and the region A1' with respect to the touch panel 211 are not necessarily the same and the areas of the region A2 and the region A2' with respect to the touch panel 211 are not necessarily the same either.

Accordingly, as mentioned later in this embodiment, the first touch area refers to the area of the region A1 or the region A1' with respect to the touch panel 211 and the second touch area refers to the area of the region A2 or the region A2' with respect to the touch panel 211, and this will not affect the efficacy achieved by the primary technical means of the present invention.

Figure 2C:
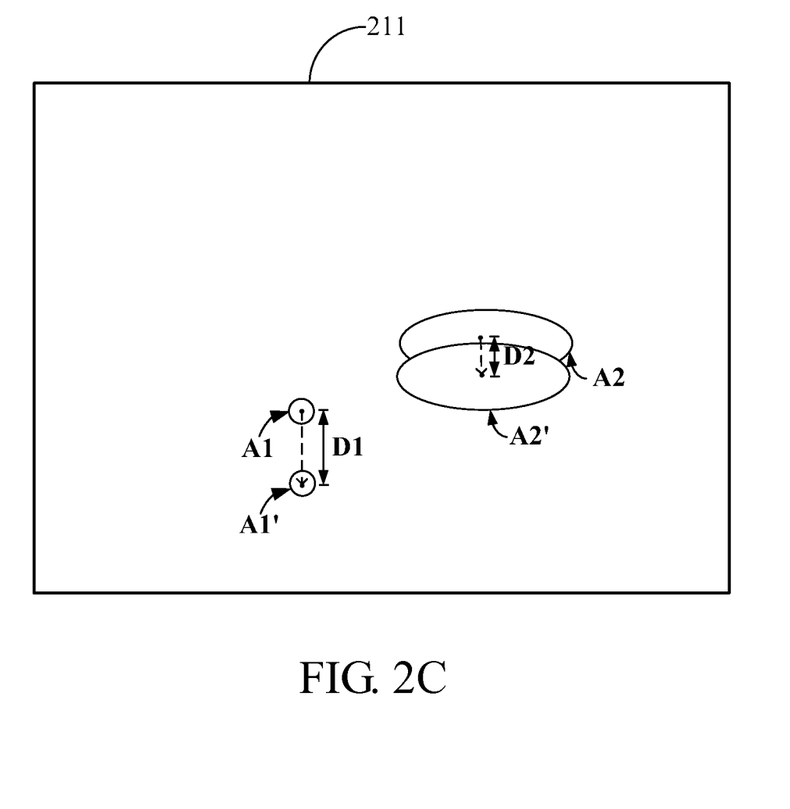

After the change of the first touched region and/or the second touched region is detected, the processor 213 calculates a first gravity center of the first touch area of the first touched region (i.e., the region A1/A1') as well as a first moving distance D1 of the first gravity center, and calculates a second gravity center of the second touch area of the second touched region (i.e., the region A2/A2') as well as a second moving distance D2 of the second gravity center, as shown in FIG. 2C. Furthermore, the processor 213 further calculates a first moving time of the first gravity center and a second moving time of the second gravity center.

Next, the processor 213 derives a first moving velocity according to the first moving distance and the first moving time (i.e., a ratio of the first moving distance to the first moving time), and derives a second moving velocity according to the second moving distance and the second moving time (i.e., a ratio of the second moving distance to the second moving time). Thus, according to a ratio of the first moving velocity to the first touch area and a ratio of the second moving velocity to the second touch area, the processor 213 can identify one of the first touched region (i.e., the region A1/A1') and the second touched region (i.e., the region A2/A2') as being touched by a major input object (i.e., the touch stylus 13 of this embodiment) and the other of the first touched region and the second touched region as being touched by a non-major input object (i.e., the hand 15 of this embodiment).

It shall be noted that in other embodiments, the major input object may be any object that can be used as a major input device, and the non-major input object may be another part of the human body or any non-major input device.

In detail, in terms of the writing habits of common users, the area of the touch panel 211 touched by the touch stylus 13 is usually smaller than the area of the touch panel 211 touched by the hand 15. Additionally, because the touch stylus 13 is the major input object, the moving velocity of the touch stylus 13 on the touch panel 211 is also usually faster than that of the hand 15. Then, according to the ratio of the moving velocity to the area of each of the touch stylus 13 and the hand 15, the present invention can identify which touched region is touched by the touch stylus 13.

Specifically, the ratio of the moving velocity to the area of each of the first touched region and the second touched region is represented by a relative velocity factor (RVF) in the present invention, so the RVF of the first touched region is the first moving velocity divided by the first touch area and the RVF of the second touched region is the second moving velocity divided by the second touch area.

According to the RVFs of the first touched region and the second touched region, the processor 213 can take the touched region with a larger RVF as being touched by the major input object (i.e., the touch stylus 13 of this embodiment) and take the touched region with a smaller RVF as being touched by the non-major input object (i.e., the hand 15 of this embodiment). Thus, the processor 213 can perform other operations according to the touched region touched by the touch stylus 13.

Additionally, in other embodiments, the RVF can be defined as a ratio of the moving velocity of the touched region to the number of the sensing units corresponding to the touched region, and this can also achieve the efficacy of identifying the touched region touched by the major input object. In such a case, the value of the first touch area may be defined as a number of the sensing units corresponding to the first touched region (i.e., the region A1/A1'), and the value of the second touch area may be defined as a number of the sensing units corresponding to the second touched region (i.e., the region A2/A2').

Figure 2D:
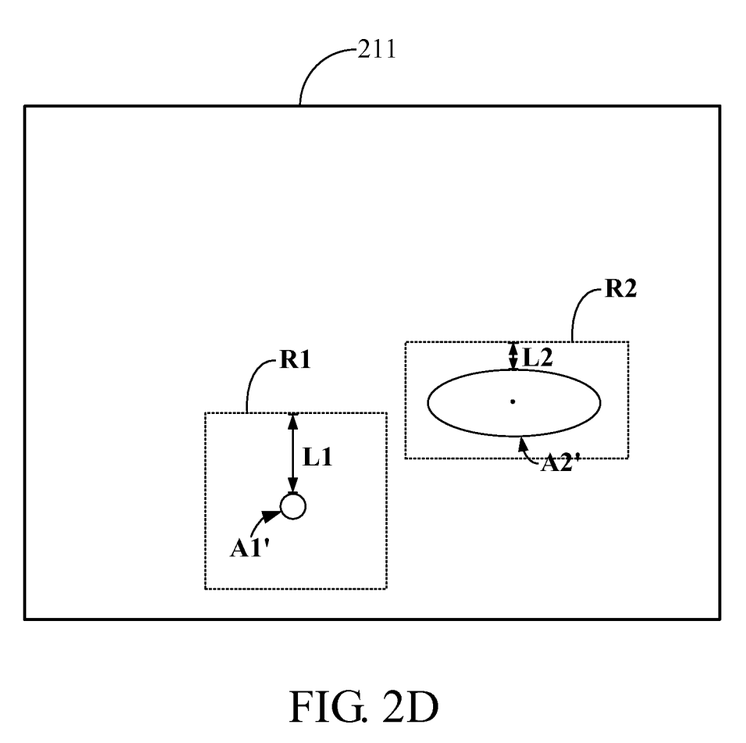

Referring continuously to FIG. 2D, the processor 213 further defines a major input region R1 and a non-major input region R2 after the major input object and the non-major input object are identified. Specifically, if the processor 213 identifies the first touched region (i.e., the region A1') as being touched by the touch stylus 13, then the processor 213 will take the variation of the electrical parameter value exhibited by sensing units located within a first distance L1 from the region A1' (i.e., the sensing units within the major input region R1) as being touched by the touch stylus 13.

On the other hand, if the processor 213 identifies the second touched region (i.e., the region A2') as being touched by the hand 15, then the processor 213 will take the variation of the electrical parameter value exhibited by sensing units located within the second distance L2 from the region A2' (i.e., the sensing units within the non-major input region R2) as being touched by the hand 15. It shall be appreciated that the moving distance of the hand 15 is usually shorter than that of the touch stylus 13, so the first distance L1 is longer than the second distance L2 in general conditions.

Furthermore, because the region A1' and the region A2' may change in position and/or in area with movement of the touch stylus 13 and the hand 15 respectively, the major input region R1 and the non-major input region R2 will also change in position and in area in response to the change in position and/or in area of the region A1' and the region A2'.

Additionally, the touch panel 211 of the present invention may be a capacitive touch panel, and the variation of the electrical parameter value exhibited by each of the sensing units is a variation of a capacitance value. Because the variations of the capacitance values exhibited by touching the touch panel 211 with the touch stylus 13 and the hand 15 are different from each other, the processor 213 can further preliminarily identify one of the first touched region and the second touched region as being touched by the major input object and the other of the first touched region and the second touched region as being touched by the non-major input object according to the capacitance values of the sensing units.

It shall be appreciated that although the aforesaid preliminary identification can be supplementary to the identification result obtained by the processor 213 according to the RVFs, the processor 213 in this embodiment performs identification mainly in accordance with the RVFs with the capacitance value that is only used as an auxiliary reference. Furthermore, in other embodiments, the touch panel 211 may also be one of a resistive touch panel, an IR touch panel and an ultrasonic touch panel, so those of ordinary skill in the art can readily appreciate how to accomplish the operations and functions of the present invention according to the electrical parameter values of different types of touch panels.

Figure 3:
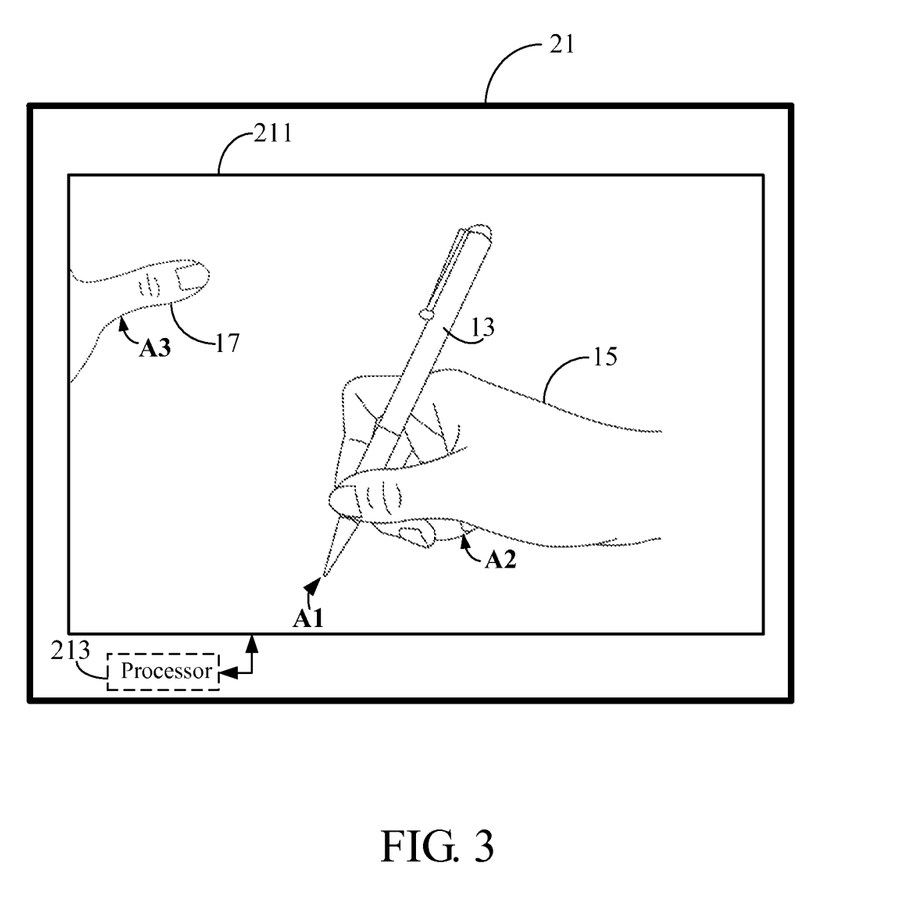
FIG. 3 is a schematic view illustrating operations on the touch-controlled device of the present invention, which corresponds to the second embodiment of the present invention.

The second embodiment of the present invention is shown in FIG. 3, which depicts another implementation of operations on the touch-controlled device 21 of the present invention. Unlike the first embodiment, it is likely that the user's hand 17 that holds the touch-controlled device 21 touches a region A3 of the touch panel 211 when the user is operating the touch-controlled device 21, as shown in FIG. 3. In such a case, the electrical parameter value of the sensing units of the region A3 will be changed. Then, the processor 213 can detect a third touched region of the touch panel and defines a third touch area of the third touched region.

Furthermore, as in the first embodiment, in response to movement of the touch stylus 13, the hand 15 and the hand 17, the processor 213 also calculates a third moving velocity of the third touched region and a ratio of the third moving velocity to the third touch area (i.e., an RVF of the third touched region). Because the third touch area is defined in substantially the same way as the first touch area and the second touch area and the third moving velocity is calculated also in substantially the same way as the first moving velocity and the second moving velocity, these will not be further described herein.

Then, the processor 213 identifies one of the first touched region, the second touched region and the third touched region as being touched by the major input object (i.e., the touch stylus 13 of this embodiment) and the other two of the first touched region, the second touched region and the third touched region as being touched by the non-major input objects (i.e., the hand 15 and the hand 17 of this embodiment) according to the ratio of the first moving velocity to the first touch area (i.e., the RVF of the first touched region), the ratio of the second moving velocity to the second touch area (i.e., the RVF of the second touched region) and the ratio of the third moving velocity to the third touch area (i.e., the RVF of the third touched region).

It shall be appreciated that, unlike the first embodiment, the processor 213 in the second embodiment identifies one of the first touched region, the second touched region and the third touched region as being touched by the major input object according to the RVFs of the first touched region, the second touched region and the third touched region when the three regions of the touch panel 211 are touched. However, in other embodiments, the processor 213 of the touch-controlled device 21 of the present invention may also identify one of more than three touched regions as being touched by the major input object according to the RVFs of the touched regions when the more than three regions of the touch panel 211 are touched. Accordingly, identifying one of more than three touched regions as being touched by the major input object in response to the more than three regions of the touch panel 211 being touched shall all be covered within the scope of the present invention.

Figure 4:
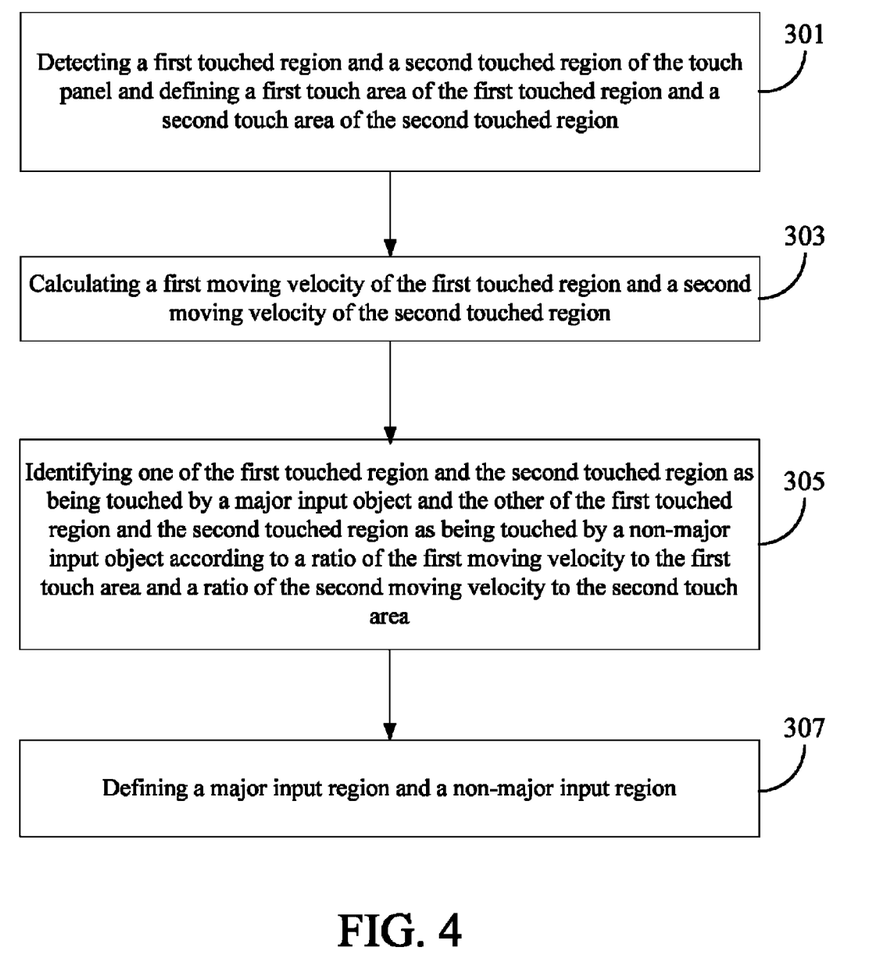
FIG. 4 is a flowchart diagram of an identifying method of the present invention, which corresponds to the third embodiment of the present invention.

The third embodiment of the present invention is an identifying method; a flowchart diagram of which is shown in FIG. 4. The identifying method of the present invention applies to the processor 213 of the touch-controlled device 21 described in the first embodiment and the second embodiment. Specifically, the identifying method described in this embodiment can be implemented by a computer program product. When the computer program product is loaded into a touch-controlled device with a touch panel and a processor and a plurality of codes comprised in the computer program product is executed by the processor, the identifying method described in this embodiment can be accomplished. The aforesaid computer program product may be stored in a computer-readable recording medium, such as a read only memory (ROM), a flash memory, a floppy disk, a hard disk, a compact disk (CD), a mobile disk, a magnetic tape, a server accessible to networks, or any other storage media with the same function and well known to those skilled in the art.

First, step 301 is executed to detect a first touched region and a second touched region of the touch panel and define a first touch area of the first touched region and a second touch area of the second touched region. Then, step 303 is executed to calculate a first moving velocity of the first touched region and a second moving velocity of the second touched region. Specifically, step 303 is executed to calculate a first gravity center of the first touch area of the first touched region as well as a first moving distance and a first moving time of the first gravity center to obtain a ratio of the first moving distance to the first moving time as the first moving velocity, and calculate a second gravity center of the second touch area of the second touched region as well as a second moving distance and a second moving time of the second gravity center to obtain a ratio of the second moving distance to the second moving time as the second moving velocity.

In different embodiments, under the condition that the first moving time is equal to the second moving time, the first moving distance and the second moving distance are equivalent to the first moving velocity and the second moving velocity respectively and can also be applied to subsequent operations.

Then, step 305 is executed to identify one of the first touched region and the second touched region as being touched by a major input object and the other of the first touched region and the second touched region as being touched by a non-major input object according to a ratio of the first moving velocity to the first touch area and a ratio of the second moving velocity to the second touch area. In other words, an RVF of the first touched region and an RVF of the second touched region can be obtained through the step 305 so that one of the first touched region and the second touched region can be identified as being touched by a major input object according to the RVF of the first touched region and the RVF of the second touched region.

Next, step 307 is executed to define a major input region and a non-major input region after the major input object and the non-major input object are identified. Accordingly, if the electrical parameter value of the sensing units corresponding to the major input region is changed, then it will be viewed as being caused by the touch of the major input object; and if the electrical parameter value of the sensing units corresponding to the non-major input region is changed, then it will be viewed as being caused by the touch of the non-major input object.

Additionally, if the touch panel is a capacitive touch panel, then the step 301 may further comprise the following step of: preliminarily identifying the one of the first touched region and the second touched region as being touched by the major input object and the other of the first touched region and the second touched region as being touched by the non-major input object according to the capacitance values of the sensing units. Thus, as a supplement to the identification result that is finally obtained according to the RVFs, the processor can preliminarily identify the one of the first touched region and the second touched region as being touched by the major input object according to the capacitance values of the sensing units.

Additionally, as described in the second embodiment, there may be three regions of the touch panel that are touched by different devices. In such a case, step 301 is executed to further detect a third touched region of the touch panel and define a third touch area of the third touched region, and step 303 is executed to further calculate a third moving velocity of the third touched region. Then, step 305 is executed to identify one of the first touched region, the second touched region and the third touched region as being touched by the major input object and the other two of the first touched region, the second touched region and the third touched region as being touched by two non-major input objects according to the ratio of the first moving velocity to the first touch area, the ratio of the second moving velocity to the second touch area and a ratio of the third moving velocity to the third touch area. Therefore, step 307 is executed to define a major input region for the major input object and define a non-major input region for the two non-major input objects respectively.

In addition to the aforesaid steps, the third embodiment can also execute all the operations and functions set forth in the first embodiment and the second embodiment. The identifying method for a processor of an identifying device of the present invention will be readily appreciated by those of ordinary skill in the art based on the explanation of the first embodiment and the second embodiment, and thus will not be further described herein.

According to the above descriptions, the touch-controlled device and the identifying method of the present invention identify one of the touched regions as being touched by a major input object according to the ratio of a moving velocity to an area of each of the touched regions. Accordingly, as compared to the conventional touch-controlled devices, the present invention allows the user to operate the touch-controlled device of the present invention in the usual writing habits, thereby improving the convenience in use.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:
1. A touch-controlled device, comprising:
   a touch panel; and
   a processor electrically connected to the touch panel, being configured to detect a first touched region and a second touched region of the touch panel and to define a first touch area of the first touched region and a second touch area of the second touched region, wherein the processor is further configured to calculate a first moving velocity of the first touched region and a second moving velocity of the second touched region, and identify one of the first touched region and the second touched region as being touched by a major input object and the other of the first touched region and the second touched region as being touched by a non-major input object according to a ratio of the first moving velocity to the first touch area and a ratio of the second moving velocity to the second touch area.

2. The touch-controlled device as claimed in claim 1, wherein the touch panel is a capacitive touch panel and comprises a plurality of sensing units, and the processor is configured to detect the first touched region and the second touched region according to a capacitance value of each of the sensing units.

3. The touch-controlled device as claimed in claim 2, wherein the processor is configured to define the first touch area according to a number of the sensing units corresponding to the first touched region, and to define the second touch area according to a number of the sensing units corresponding to the second touched region.

4. The touch-controlled device as claimed in claim 2, wherein the processor is further configured to preliminarily identify the one of the first touched region and the second touched region as being touched by the major input object and the other of the first touched region and the second touched region as being touched by the non-major input object according to the capacitance values of the sensing units.

5. The touch-controlled device as claimed in claim 1, wherein the processor is further configured to calculate a first gravity center of the first touch area of the first touched region and a first moving distance and a first moving time of the first gravity center, and the first moving velocity is a ratio of the first moving distance to the first moving time; and the processor is further configured to calculate a second gravity center of the second touch area of the second touched region and a second moving distance and a second moving time of the second gravity center, and the second moving velocity is a ratio of the second moving distance to the second moving time.

6. The touch-controlled device as claimed in claim 1, wherein the processor is further configured to define a major input region and a non-major input region after the major input object and the non-major input object are identified.

7. The touch-controlled device as claimed in claim 1, wherein the processor is further configured to detect a third touched region of the touch panel, define a third touch area of the third touched region and calculate a third moving velocity of the third touched region; and the processor is further configured to identify one of the first touched region, the second touched region and the third touched region as being touched by the major input object and the other two of the first touched region, the second touched region and the third touched region as being touched by the non-major input object according to the ratio of the first moving velocity to the first touch area, the ratio of the second moving velocity to the second touch area and a ratio of the third moving velocity to the third touch area.

8. The touch-controlled device as claimed in claim 1, wherein the major input object is a touch stylus, and the non-major input object is a part of a human body.

9. An identifying method for a touch-controlled device, the touch-controlled device comprising a touch panel and a processor, and the identifying method being executed by the processor, the identifying method comprising the following steps of:

(a) detecting a first touched region and a second touched region of the touch panel and defining a first touch area of the first touched region and a second touch area of the second touched region;

(b) calculating a first moving velocity of the first touched region and a second moving velocity of the second touched region; and (c) identifying one of the first touched region and the second touched region as being touched by a major input object and the other of the first touched region and the second touched region as being touched by a non-major input object according to a ratio of the first moving velocity to the first touch area and a ratio of the second moving velocity to the second touch area.

10. The identifying method as claimed in claim 9, wherein the touch panel is a capacitive touch panel and comprises a plurality of sensing units, and the step (a) is to detect the first touched region and the second touched region according to a capacitance value of each of the sensing units.

11. The identifying method as claimed in claim 10, wherein the step (a) is to define the first touch area according to a number of the sensing units corresponding to the first touched region, and to define the second touch area according to a number of the sensing units corresponding to the second touched region.

12. The identifying method as claimed in claim 10, wherein the step (a) further comprises the following step of:

preliminarily identifying the one of the first touched region and the second touched region as being touched by the major input object and the other of the first touched region and the second touched region as being touched by the non-major input object according to the capacitance values of the sensing units.

13. The identifying method as claimed in claim 9, wherein the step (b) further comprises the following steps of:

calculating a first gravity center of the first touch area of the first touched region and a first moving distance and a first moving time of the first gravity center, wherein the first moving velocity is a ratio of the first moving distance to the first moving time; and calculating a second gravity center of the second touch area of the second touched region and a second moving distance and a second moving time of the second gravity center, wherein the second moving velocity is a ratio of the second moving distance to the second moving time.

14. The identifying method as claimed in claim 9, further comprising the following step of:

defining a major input region and a non-major input region after the major input object and the non-major input object are identified.

15. The identifying method as claimed in claim 9, wherein the step (a) further comprises the following steps of:

detecting a third touched region of the touch panel and defining a third touch area of the third touched region;

the step (b) further comprises the following steps of:

calculating a third moving velocity of the third touched region; and the step (c) further comprises the following steps of:

identifying one of the first touched region, the second touched region and the third touched region as being touched by the major input object and the other two of the first touched region, the second touched region and the third touched region as being touched by the non-major input object according to the ratio of the first moving velocity to the first touch area, the ratio of the second moving velocity to the second touch area and a ratio of the third moving velocity to the third touch area.

16. The identifying method as claimed in claim 9, wherein the major input object is a touch stylus, and the non-major input object is a part of a human body.

17. A computer program product having a program stored therein, wherein an identifying method is executed when the program is loaded into a processor, the program comprising the following codes:
   a code A for detecting a first touched region and a second touched region of the touch panel and defining a first touch area of the first touched region and a second touch area of the second touched region;
   a code B for calculating a first moving velocity of the first touched region and a second moving velocity of the second touched region; and
   a code C for identifying one of the first touched region and the second touched region as being touched by a major input object and the other of the first touched region and the second touched region as being touched by a non-major input object according to a ratio of the first moving velocity to the first touch area and a ratio of the second moving velocity to the second touch area.

18. The computer program product as claimed in claim 17, wherein the touch panel is a capacitive touch panel and comprises a plurality of sensing units, and the code A is configured to detect the first touched region and the second touched region according to a capacitance value of each of the sensing units.

19. The computer program product as claimed in claim 18, wherein the code A is configured to define the first touch area according to a number of the sensing units corresponding to the first touched region, and to define the second touch area according to a number of the sensing units corresponding to the second touched region.

20. The computer program product as claimed in claim 18, wherein the code A further comprises the following code:
   a code A1 for preliminarily identifying the one of the first touched region and the second touched region as being touched by the major input object and the other of the first touched region and the second touched region as being touched by the non-major input object according to the capacitance values of the sensing units.

21. The computer program product as claimed in claim 17, wherein the code B further comprises the following codes:
   a code B1 for calculating a first gravity center of the first touch area of the first touched region and a first moving distance and a first moving time of the first gravity center, wherein the first moving velocity is a ratio of the first moving distance to the first moving time; and
   a code B2 for calculating a second gravity center of the second touch area of the second touched region and a second moving distance and a second moving time of the second gravity center, wherein the second moving velocity is a ratio of the second moving distance to the second moving time.

22. The computer program product as claimed in claim 17, further comprising the following code:
   a code D for defining a major input region and a non-major input region after the major input object and the non-major input object are identified.

23. The computer program product as claimed in claim 17, wherein the code A further comprises the following code:
   a code A1 for detecting a third touched region of the touch panel and defining a third touch area of the third touched region;
   the code B further comprises the following code:
   a code B1 for calculating a third moving velocity of the third touched region; and
   the code C further comprises the following code:
   a code C1 for identifying one of the first touched region, the second touched region and the third touched region as being touched by the major input object and the other two of the first touched region, the second touched region and the third touched region as being touched by the non-major input object according to the ratio of the first moving velocity to the first touch area, the ratio of the second moving velocity to the second touch area and a ratio of the third moving velocity to the third touch area.

24. The computer program product as claimed in claim 17, wherein the major input object is a touch stylus, and the non-major input object is a part of a human body.

* * * * *